(12) United States Patent
Kim

(10) Patent No.: US 8,786,154 B2
(45) Date of Patent: Jul. 22, 2014

(54) ROTOR CORE OF MOTOR

(75) Inventor: Jinyong Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 60 days.

(21) Appl. No.: 13/483,884

(22) Filed: May 30, 2012

(65) Prior Publication Data

US 2013/0140937 A1    Jun. 6, 2013

(30) Foreign Application Priority Data

Dec. 1, 2011 (KR) .......................... 10-2011-0127507

(51) Int. Cl.
*H02K 1/28* (2006.01)

(52) U.S. Cl.
USPC ..................................... 310/156.09

(58) Field of Classification Search
USPC .......... 301/156.09, 156.22, 216.116, 216.123
See application file for complete search history.

(56) References Cited

U.S. PATENT DOCUMENTS

| 4,792,713 | A * | 12/1988 | Bush ...................... 310/216.123 |
| 6,388,353 | B1 * | 5/2002 | Liu et al. .................. 310/156.09 |
| 8,234,776 | B2 * | 8/2012 | Lopez ............................. 29/598 |
| 2009/0195101 | A1 * | 8/2009 | Yang et al. ............... 310/156.22 |

FOREIGN PATENT DOCUMENTS

| JP | S52-131110 | 11/1977 |
| JP | 61-022732 A | 1/1986 |
| JP | 2004-248442 A | 9/2004 |
| JP | 2004-248443 A | 9/2004 |
| JP | 2008-178229 A | 7/2008 |
| JP | 2008-178253 A | 7/2008 |
| JP | 2009-207296 A | 9/2009 |
| JP | 2011-166951 A | 8/2011 |

OTHER PUBLICATIONS

Office Action dated Oct. 8, 2012 in Korean Application No. 10-2011-0127507, filed Dec. 1, 2011.
Office Action dated Feb. 25, 2014 in Japanese Application No. 2012-208445.

* cited by examiner

*Primary Examiner* — Dang Le
(74) *Attorney, Agent, or Firm* — Saliwanchik, Lloyd & Eisenschenk

(57) ABSTRACT

Provided is a stacked rotor core of a motor, the rotor core including a thin disk-shaped rotor core member including a shaft hole extended to a direction of a rotation shaft, a key groove communicating with the shaft hole and a magnet, a shaft press-fitted into the shaft hole and concavely formed at a peripheral position corresponding to that of the key groove with a key accommodation groove, and at least one or more keys formed at the key groove and the key accommodation groove to restrict the rotor core member and the shaft.

10 Claims, 5 Drawing Sheets

ROTOR CORE OF MOTOR

This application claims the benefit under 35 U.S.C. §119 of Korean Patent Application No. 10-2011-0127507, filed Dec. 1, 2011, which is hereby incorporated by reference in its entirety.

BACKGROUND

1. Field of Endeavor

The present disclosure relates to a rotor core of a BLDC motor.

2. Background

This section provides background information related to the present disclosure which is not necessarily prior art.

In general, a rotor of a BLDC (Brushless direct current) motor is formed by press-fitting a shaft into a rotor core formed by being stacked with thin rotor core members. At this time, a surface of the shaft is performed with a surface treatment using mechanical means, e.g., knurling or skiving to inhibit the stacked rotor core and the shaft from idling. Once the shaft is surface-treated with knurling or skiving, press-fit force, pull-off force and resistance to rotational force are determined by interference between the surface treatment and a shaft hole of the rotor core.

Meantime, in case of the rotor core formed by stacking a plurality of disk-shaped rotor core members, a single rotor core having a predetermined height may be formed to be press-fitted into a skived shaft. In a case where a rotor core with more than a predetermined length is used, the rotor core is modularized at each predetermined height for easy press-fitting process, and sequentially press-fitted.

However, in case of sequential press-fitting of rotor cores, the skived surface of the shaft may be damaged in the press-fitting process of a first rotor core module, a sufficient interference cannot be reacted on second and third rotor core modules as calculated in design, and coherence between the rotor core and the shaft is not sufficiently formed to cause the shaft and the core to idle during rotation of rotor, whereby accurate power transmission and control cannot be realized.

Furthermore, in a case a tolerance between the shaft and the rotor core module is narrowly formed to inhibit from idling, an excessive stress may be generated on the shaft and the rotor core modules to generate defects such as a broken shaft, a twisted rotor core module and/or a bent deformed shaft, and in a case a magnet is installed inside the rotor core module, a magnet insertion hole for inserting the magnet may be deformed to cause a difficulty in assembling process.

Still furthermore, in case of surface treatment by skiving that is frequently used for general press-fitting process, there is a difficulty in maintaining a constant assembly performance due to thermal shrinkage/expansion, and the skew type press-fitting process twistingly arranging a plurality of rotor core members each at a predetermined angle also creates a cumbersomeness that needs adjustment of assembly angle using a jig.

It is, therefore, desirable to overcome the above problems and others by providing an improved rotor core of a motor.

BRIEF SUMMARY

This section provides a general summary of the disclosure, and is not a comprehensive disclosure of its full scope or all of its features.

The present disclosure has been made to solve the foregoing problem(s) of the prior art, and therefore an object of certain embodiments of the present invention is to provide a rotor core of a motor configured to maintain a predetermined level of coherence between a shaft and the rotor core in the press-fitting process by improving a shaft surface and a shape of an inner diameter of the rotor core.

In one general aspect of the present disclosure, there is provided a stacked rotor core of a motor, the rotor core comprising: a thin disk-shaped rotor core member including a shaft hole extended to a direction of a rotation shaft, a key groove communicating with the shaft hole and a magnet; a shaft press-fitted into the shaft hole and concavely formed at a peripheral position corresponding to that of the key groove with a key accommodation groove; and at least one or more keys formed at the key groove and the key accommodation groove to restrict the rotor core member and the shaft.

Preferably, but not necessarily, the rotor core member includes a first rotor core stacked with a predetermined number of rotor core members to a direction of the rotation shaft and formed with a key groove at a first position, a second rotor core stacked with the same number of rotor core members as that of the first rotor core to a direction of the rotation shaft, and formed with the key groove at a second position having a predetermined angle difference from the first position, and a third rotor core stacked with the same number of rotor core members as that of the first rotor core to a direction of the rotation shaft, and formed with the key groove at a third position having a predetermined angle difference from the second position, wherein each key groove formed at the first, second and third rotor cores is arranged at a 120° angle.

Preferably, but not necessarily, the key is press-fitted into a key insertion groove provided at the shaft.

Preferably, but not necessarily, the key groove is provided in a shape corresponding to a width of the key.

Preferably, but not necessarily, each of the first, second and third rotor cores is formed with a key groove, the shaft is formed with a key accommodation groove at a position corresponding to the key groove provided at each of the first, second and third rotor cores, and the first, second and third rotor cores are restricted of relative rotation between the shaft and the rotor cores by each key.

Preferably, but not necessarily, the key is press-fitted into the key accommodation groove to a direction perpendicular to an axial direction of the rotation shaft, and press-fitted into the key accommodation groove to a direction parallel with an axial direction of the rotation shaft.

Preferably, but not necessarily, the key is formed with a round portion relative to insertion and disengagement directions of the rotor core member.

Preferably, but not necessarily, the rotor core member is formed at each distal cross-sectional end with a first magnet disengagement inhibition member and a second magnet disengagement inhibition member.

Preferably, but not necessarily, the first magnet disengagement inhibition member includes a disk-shaped through hole corresponding to a diameter of the shaft, and at least one or more hook lugs protrusively formed at an inner side of the through hole to be hooked to a reception groove formed at a position corresponding to that of the shaft, wherein the hook lug is hooked by being rotated to a direction perpendicular to an axial direction after being inserted into the reception groove to the axial direction of the shaft.

Preferably, but not necessarily, the second magnet disengagement inhibition member takes a shape of a disk, corresponds to a diameter of the shaft and is formed with a D-cut portion on at least one area.

Preferably, but not necessarily, the shaft includes the second magnet disengagement inhibition member and a flange unit supporting the rotor core member.

Preferably, but not necessarily, the rotor core further comprises a ring-shaped elastic member interposed between the flange unit and the second magnet disengagement inhibition member.

The rotor core of motor according to the present disclosure has an advantageous effect in that a shaft and a rotor core member are inhibited from idling by coupling between a key and a key groove, such that it is possible to form a sufficient tolerance between the shaft and a shaft hole of the rotor core member, whereby a shaft press-fitting process can be easily performed.

Another advantage is that reliability free from thermal shrinkage and expansion can be maintained because of assemblage using a key.

Still another advantage is that first and second magnet disengagement inhibition members inhibit a magnet from being disengaged to an axial direction of the shaft.

Still further advantage is that an elastic member is interposed between the flange unit integrally formed with the shaft and the second magnet disengagement inhibition member to minimize noise and vibration generated during rotation of the rotor core member, and an accumulated tolerance of the rotor core member can be reduced by using a virtual pressure of the elastic member.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Figure 1:
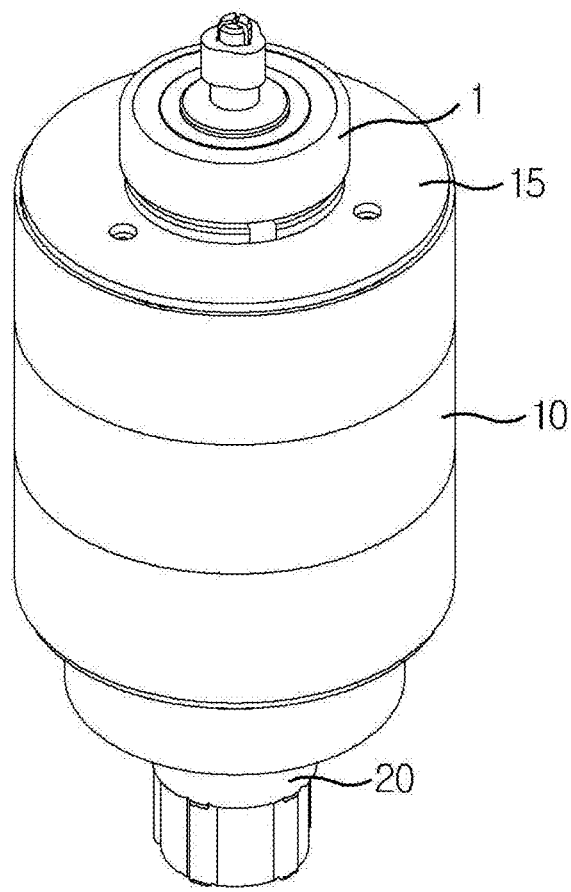
FIG. 1 is a schematic perspective view illustrating an assembled state of a rotor core according to an exemplary embodiment of the present disclosure.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first", "second", and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a rotor motor of motor according to the present disclosure will be described in detail with reference to the accompanying drawings.

Hereinafter, the present disclosure will be described based on an example of a BLDC motor among many motors, however, configuration of BLDC motor has nothing to do with the subject matter of the present disclosure, such that a detailed description of the BLDC motor will be omitted, and description of a stacked rotor core of a motor, which is the characteristic configuration of the present disclosure, will be focused.

Figure 2:
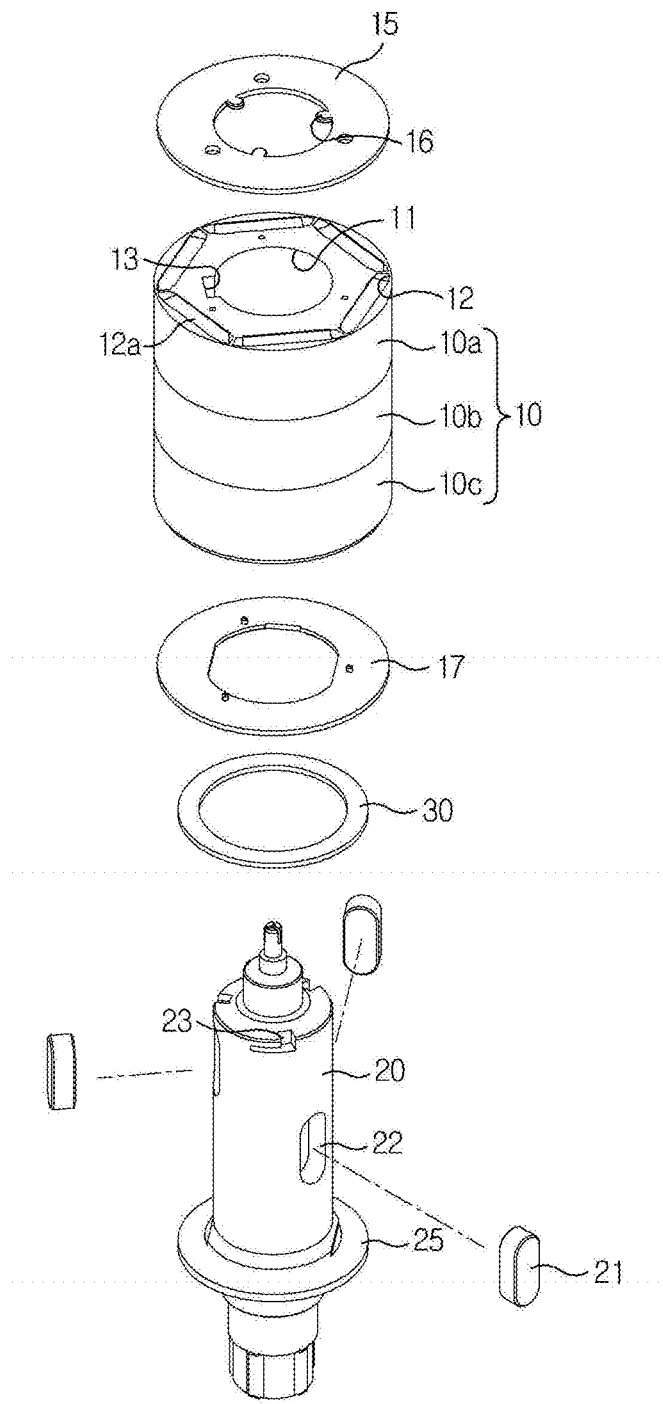
FIG. 2 is an exploded perspective view of FIG. 1.
Figure 3:
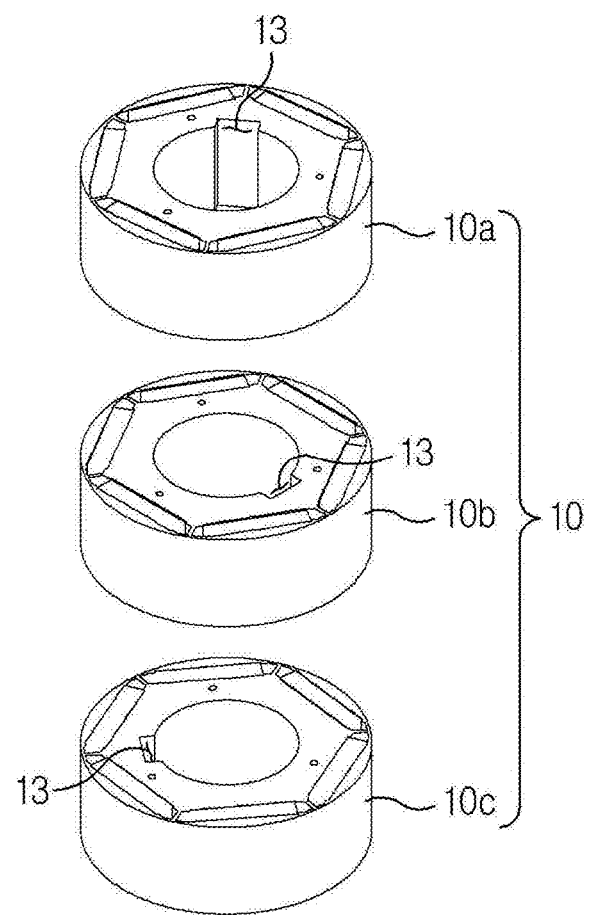
FIG. 3 is an exploded perspective view illustrating the rotor core of FIG. 1.
Figure 4:
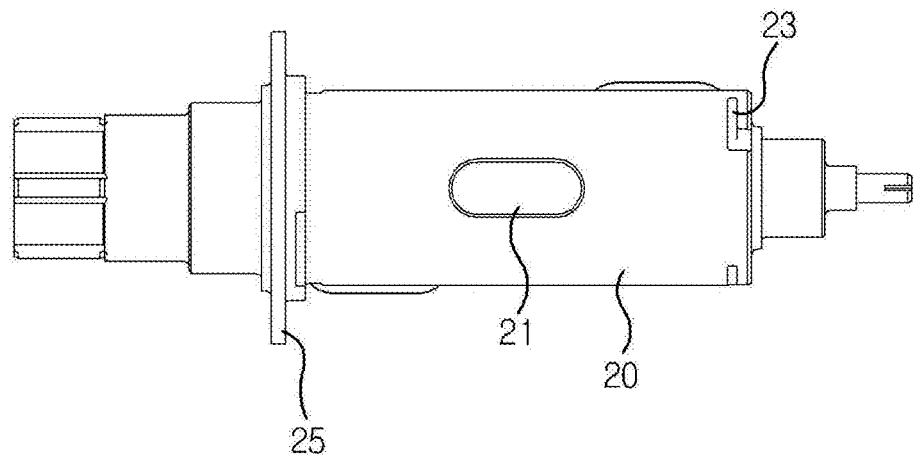
FIG. 4 is a lateral view illustrating a coupled state of key to a shaft of FIG. 1.
Figure 5:
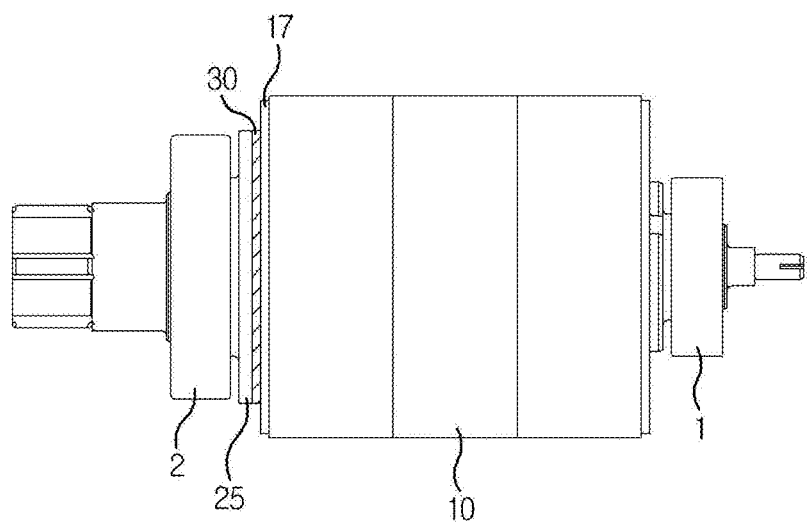
FIG. 5 is a lateral view illustrating a coupled state of a rotor core member to FIG. 4.
Figure 6:
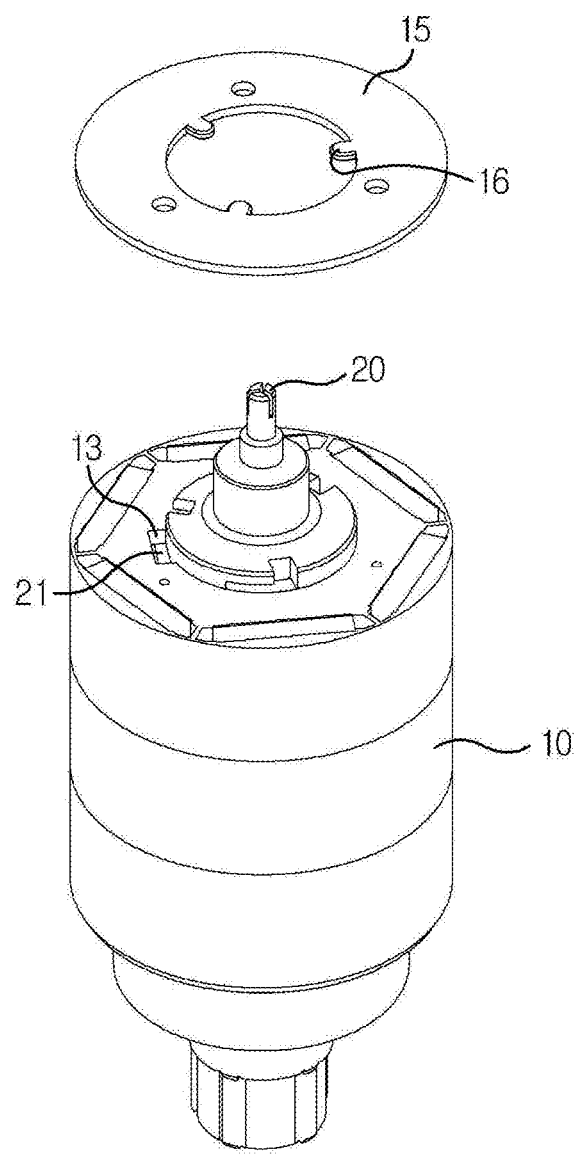
FIG. 6 is a schematic exploded perspective view illustrating a first magnet disengagement inhibition member dismounted from a rotor core according to an exemplary embodiment of the present disclosure.

FIG. 1 is a schematic perspective view illustrating an assembled state of a rotor core according to an exemplary embodiment of the present disclosure, FIG. 2 is an exploded perspective view of FIG. 1, FIG. 3 is an exploded perspective view illustrating the rotor core of FIG. 1, FIG. 4 is a lateral view illustrating a coupled state of key to a shaft of FIG. 1, FIG. 5 is a lateral view illustrating a coupled state of a rotor core member to FIG. 4, and FIG. 6 is a schematic exploded perspective view illustrating a first magnet disengagement inhibition member dismounted from a rotor core according to an exemplary embodiment of the present disclosure.

Referring to FIGS. 1 and 3, a stacked rotor core of a motor according to the present disclosure includes a rotor core member (10) provided with a plurality of rotor core plates and a shaft (20).

The rotor core member (10) is formed by being stacked with a plurality of thin iron disk plates each plate having a thickness of approximately 0.5 mm. The rotor core plate is formed by punching a thin iron plate, and a plurality of rotor core plates is stacked to form the rotor core member (10).

Referring to FIGS. 1 and 3 again, the rotor core member (10) is formed with first, second and third rotor cores (10a, 10b, 10c) stacked with the rotor core plates each at a predetermined height and each at a predetermined angle of deviation, through which a shaft (20) is centrally press-fitted, and the predetermined angle is preferably 120°.

A shaft hole (11) is formed at a center of the rotor core member to allow the shaft (20) to pass therethrough and to be press-fitted thereinto. The shaft hole (11) is preferably formed with an approximately round shape.

A magnet insertion hole (12) is penetratively formed at a position near to a periphery of the rotor core member. The magnet insertion hole (12) is inserted and coupled by a magnet (12a) inserted to a direction in parallel with a center shaft of the shaft hole (11). Preferably, a plurality of magnet insertion holes (12) is penetratively formed each at a predetermined interval, and according to an exemplary embodiment of the present disclosure, a total of six (6) regular hexagonal magnet insertion holes (12) is preferably formed along a periphery of the rotor core member.

Meanwhile, the number of magnet insertion holes (12) may increase or decrease depending on changed size of rotor core, in addition to the number of total of six (6) magnet insertion holes, such that the number of magnet insertion holes may include a regular pentagonal (5 pieces), a regular octagonal (8 pieces) or more than a regular hexagonal magnet insertion holes (6 pieces).

A key groove (13) is formed at an inner circumferential surface of the shaft hole (11) at a predetermined depth, and preferably, one key groove (13) is formed at each of the first, second and third rotor core members (10a, 10b, 10c) as shown in FIG. 3. The depth of the key groove (13) preferably corresponds to a protrusive height of a key (21, described later). According to the configuration thus described, each key (21) press-fitted into the shaft (20) is coupled to each of the first, second and third rotor core members (10a, 10b, 10c), whereby the first, second and third rotor core members (10a, 10b, 10c) and the shaft (20) can be inhibited from slipping to rotate together.

Meanwhile, the rotor core member (10) may be formed at an upper lateral end and a bottom lateral end with a ring-shaped first magnet disengagement inhibition member (15) and a ring-shaped second magnet disengagement inhibition member (17) to inhibit the magnet (12a) from being disengaged to an axial direction.

The first magnet disengagement inhibition member (15) includes a disk-shaped through hole corresponding to a diameter of the shaft (20), and preferably, at least one or more hook lugs (16) are protrusively formed at an inner circumferential surface of the through hole. At least three hook lugs (16) may be formed each spaced apart at a 120°. The first magnet disengagement inhibition member (15) is inhibited from being disengaged to an axial direction by the hook lug (16)

That is, the hook lug (16) is hooked to a reception groove (23) formed at a position corresponding to that of the shaft (20), where the hooking lug (16) may be inserted into the reception groove (23) to the axial direction of the shaft (20) and rotated to a direction perpendicular to an axial direction and hooked thereto.

Furthermore, the second magnet disengagement inhibition member (17) may take a shape of a disk, correspond to a diameter of the shaft (20) and be formed with a D-cut portion on at least one area.

Referring to FIG. 2, the shaft (20) as a rotation shaft of the rotor core, may be concavely formed at a periphery with a key accommodation groove (22) having a predetermined depth for being inserted by a key (21), and formed at an upper side with the direction-changeable reception groove (23) as shown in FIGS. 4 and 6.

According to an exemplary embodiment of the present disclosure, the key accommodation groove (22) may be formed with a primary groove to an insertion direction of the hook lug (16), and formed with a secondary groove extended to a direction approximately perpendicular to a direction where the primary groove is formed, such that the hook lug (16) is inserted into the reception groove (23), rotated at a predetermined angle to a direction perpendicular to the insertion direction and locked to the axial direction.

Meanwhile, as shown in FIG. 2, the key (21) is press-fitted into the key accommodation groove (22) to a direction perpendicular to an axial direction of the shaft (20), and preferably, the key (21) is formed with a depth corresponding to that of the key groove (12). In a case the key accommodation groove (22) is two shallow, the key (21) may be disadvantageously disengaged from the key accommodation groove (22) during rotation of the shaft (20) and the rotor core member (10).

The key (21) is rounded at insertion and disengagement directions to minimize the interference with the key (21) during press-fitting of the rotor core member, and an operator is inhibited from being injured by a sharp edge during operation process.

A flange unit (25) may be integrally formed at a position corresponding to that of the second magnet disengagement inhibition member (17). The flange unit (25) may support the rotor core member (10) and the second magnet disengagement inhibition member (17).

Meanwhile, as shown in FIG. 6, an elastic member (30) may be interposed between the flange unit (25) and the second magnet disengagement inhibition member (17). The elastic member (30) may be provided with a disk-shaped member like a spring washer to absorb noise and vibration generated during rotational operation of the rotor core member (10). The elastic member (30) can apply a resilient restoring force to an axial direction of the shaft (20) to allow each rotor core member (10) to be tightly contacted between the first and second magnet disengagement inhibition member (15, 17).

As apparent from the foregoing, the rotor core of a motor according to the present disclosure has an industrial applicability in that the rotor core member (10) is inhibited from idling during rotation of the shaft (20) by the press-fitting between the key (21) and the key groove (13) during assembly of the shaft (20) and the rotor core member (20) to dispense with a post-machining process of the shaft (20) such as skiving and to enable an easy press-fitting of the rotor core member (10). Particularly, a tolerance between the rotor core member (10) and the shaft (20) can be narrowed to reduce deformation of the shaft (20) during press-fitting of the rotor core member (10) with an excessive pressure.

Another industrial applicability is that disposition of the elastic member (30) enables a reduced generation of noise and vibration during rotation of the rotor core member (10), and can minimize influence of the rotor core member (10) resultant from thermal shrinkage and expansion, whereby an accumulated tolerance that may be generated during assembly of a plurality of the rotor core members (10) can be compensated to minimize a gap between each rotor core members (10).

Although the foregoing has described and exemplified a BLDC motor, the present disclosure is not limited thereto, and other types of motors using rotors may be applied with the novel concept of the present disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A stacked rotor core of a motor, the rotor core comprising:
   a thin disk-shaped rotor core member including a shaft hole extended to a direction of a rotation shaft, a key groove communicating with the shaft hole and a magnet;
   a shaft press-fitted into the shaft hole and concavely formed at a peripheral position corresponding to that of the key groove with a key accommodation groove; and
   at least one or more keys formed at the key groove and the key accommodation groove to restrict the rotor core member and the shaft;
   wherein the rotor core member is formed at each distal cross-sectional end with a first magnet disengagement inhibition member and a second magnet disengagement inhibition member,
   wherein the first magnet disengagement inhibition member includes a disk-shaped through hole corresponding to a diameter of the shaft, and at least one or more hook lugs protrusively formed at an inner side of the through hole to be hooked to a reception groove formed at a position corresponding to that of the shaft, and
   wherein the hook lug is hooked by being rotated to a direction perpendicular to an axial direction after being inserted into the reception groove to the axial direction of the shaft.

2. The stacked rotor core of claim 1, wherein the rotor core member includes a first rotor core stacked with a predetermined number of rotor core members to a direction of the rotation shaft and formed with a key groove at a first position, a second rotor core stacked with the same number of rotor core members as that of the first rotor core to a direction of the rotation shaft, and formed with the key groove at a second position having a predetermined angle difference from the first position, and a third rotor core stacked with the same number of rotor core members as that of the first rotor core to a direction of the rotation shaft, and formed with the key groove at a third position having a predetermined angle difference from the second position, wherein each key groove formed at the first, second and third rotor cores is arranged at a 120° angle.

3. The stacked rotor core of claim 2, wherein each of the first, second and third rotor cores is formed with a key groove, the shaft is formed with a key accommodation groove at a position corresponding to the key groove provided at each of the first, second and third rotor cores, and the first, second and third rotor cores are restricted of relative rotation between the shaft and the rotor cores by each key.

4. The stacked rotor core of claim 2, wherein the key is press-fitted into the key accommodation groove to a direction perpendicular to an axial direction of the rotation shaft, and press-fitted into the key accommodation groove to a direction parallel with an axial direction of the rotation shaft.

5. The stacked rotor core of claim 1, wherein the key is press-fitted into a key insertion groove provided at the shaft.

6. The stacked rotor core of claim 1, wherein the key groove is provided in a shape corresponding to a width of the key.

7. The stacked rotor core of claim 1, wherein the key is formed with a round portion relative to insertion and disengagement directions of the rotor core member.

8. The stacked rotor core of claim 1, wherein the second magnet disengagement inhibition member takes a shape of a disk, corresponds to a diameter of the shaft and is formed with a D-cut portion on at least one area.

9. The stacked rotor core of claim 1, wherein the shaft includes the second magnet disengagement inhibition member and a flange unit supporting the rotor core member.

10. The stacked rotor core of claim 9, wherein the rotor core further comprises a ring-shaped elastic member interposed between the flange unit and the second magnet disengagement inhibition member.

* * * * *